May 4, 1965 G. E. VON GAL, JR 3,181,712
COMBINATION LOADER AND UNLOADER MACHINE
Filed May 10, 1961 6 Sheets-Sheet 1

INVENTOR.
George E. Von Gal, Jr.
BY
ATTORNEY

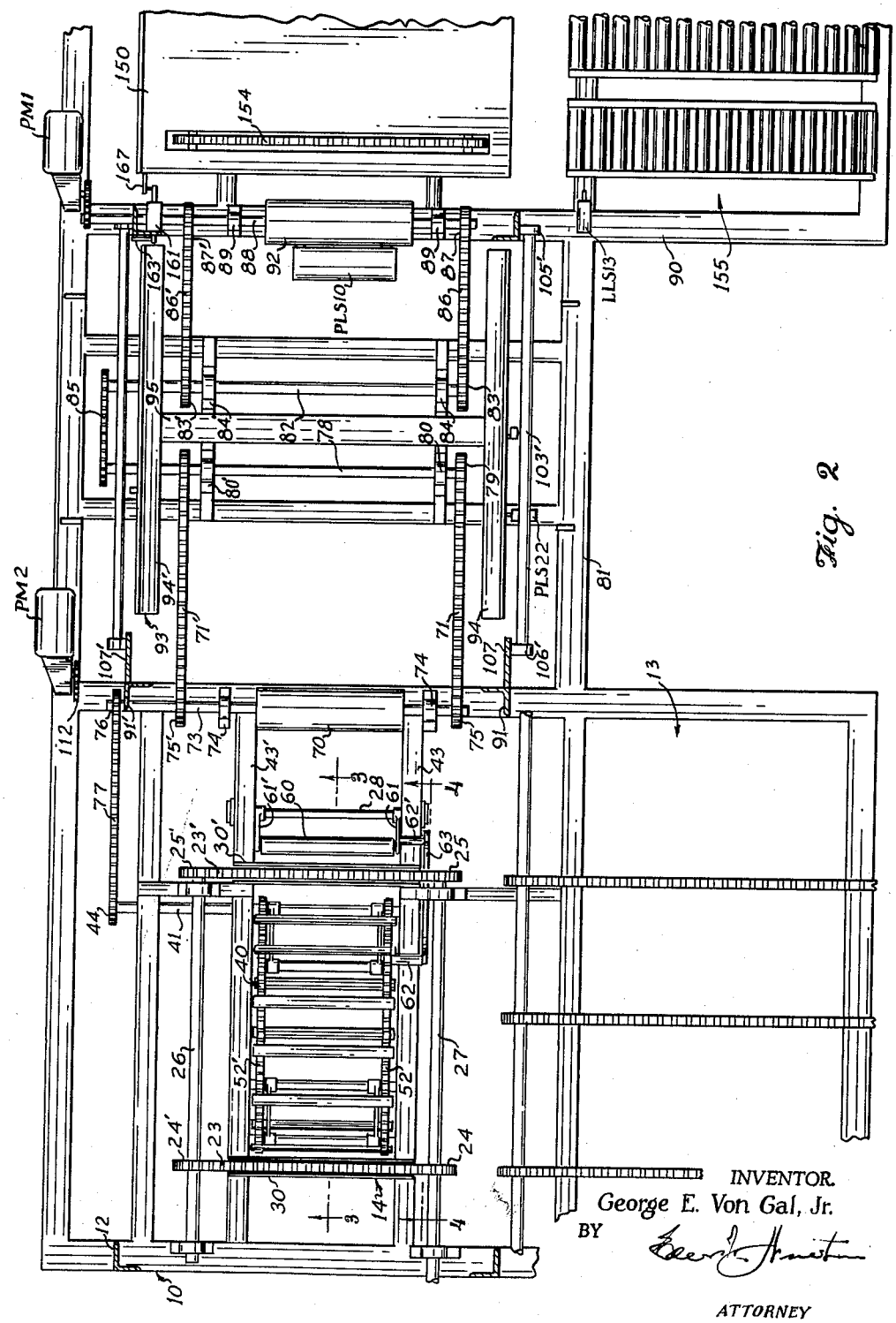

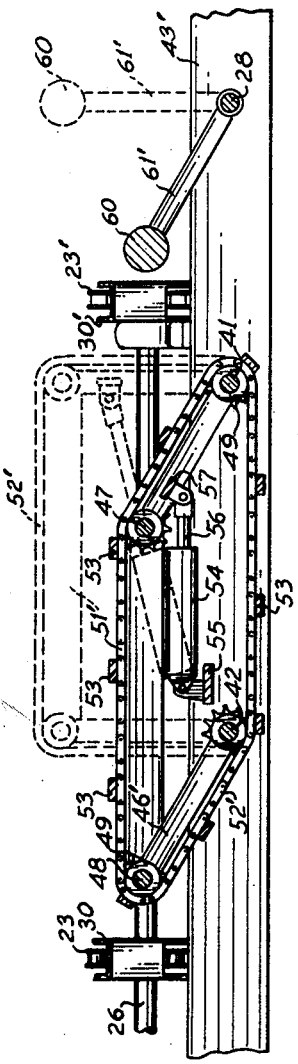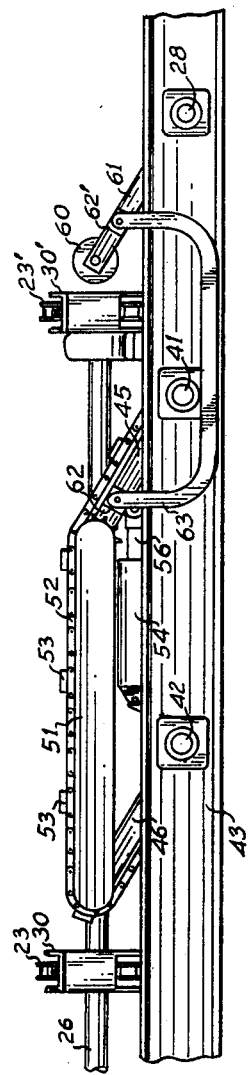

May 4, 1965     G. E. VON GAL, JR     3,181,712
COMBINATION LOADER AND UNLOADER MACHINE
Filed May 10, 1961     6 Sheets-Sheet 4

INVENTOR.
George E. Von Gal, Jr.
BY
ATTORNEY

May 4, 1965 G. E. VON GAL, JR 3,181,712
COMBINATION LOADER AND UNLOADER MACHINE
Filed May 10, 1961 6 Sheets-Sheet 5

INVENTOR.
George E. Von Gal, Jr.
BY
ATTORNEY

United States Patent Office
3,181,712
Patented May 4, 1965

3,181,712
COMBINATION LOADER AND UNLOADER
MACHINE
George E. Von Gal, Jr., 3048 Thomas Ave.,
Montgomery, Ala.
Filed May 10, 1961, Ser. No. 109,052
8 Claims. (Cl. 214—6)

This invention relates to a combination loader and unloader machine and is more particularly concerned with a pallet transfer machine for feeding pallets from an unstacking machine to a stacking machine wherein the flow of such pallets is automatically controlled according to the demands of the stacking machine or loader.

The present invention is a continuation-in-part of my copending applications Serial No. 665,334, now Patent No. 3,056,513, and Serial No. 805,412, now Patent No. 3,113,683, filed June 12, 1957 and April 10, 1959, respectively.

In the past, both stacking and unstacking or loading and unloading machines have been devised wherein a plurality of layers of articles are successively placed on a pallet by the loading or stacking machine and wherein a plurality of layers of such articles is removed from the pallet by the unloader. In the stacking machine or loader, a pallet must be supplied to the machine for each cycle of operation. Conversely, in the unstacking machine or unloader the pallet is discharged from the machine for each cycle.

In plants such as those which employ both my stacking machine and my unloader, say a soft drink plant, the bulk of the empty bottles in crates is usually received in the mornings or at some other given time while the bulk of the filled bottles is shipped out in the afternoon or at another given time. Therefore, prior to the present invention the pallets, which were accumulated during the period between receiving the empty bottles and the refilling of them, required manual storage. Further, heretofore, regardless of the respective work loads of the stacking and unstacking machines, a manual transfer of the pallets from the unstacking machine to the stacking machine was involved.

With this problem in mind, I have devised a combination loader and unloader machine wherein the pallets to be unloaded are fed on an infeed conveyor to the unloader elevator which operates in conjunction with other mechanisms in the usual manner to discharge the layers of stacked articles, such as crates, from the top portion of the unloader in single file fashion, the elevator being intermittently raised from its lowermost starting position to its uppermost position where the articles of the bottommost layer are to be discharged. Upon complete discharge of the articles from the pallet carried by the unloader elevator, the elevator automatically returns to its original lowermost position whereupon a cross feed conveyor engages the empty pallet and carries the same to a pallet magazine section between the loader and the unloader. In the pallet magazine section of the machine, the pallet is fed selectively to a storage magazine (in the event the loader requires no pallet) or to the loader (in the event there is a demand from the loader for the pallet). The arrangement of the pallet magazine section is such that the pallet if stored is lifted vertically into the magazine and supports all previously stored pallets. This lowermost pallet is also adapted to be discharged back to the cross feed conveyor in the event it is demanded by the loader. The loader is provided with a discharge conveyor and a loader elevator, the loader elevator receiving the pallets one per cycle from the cross feed conveyor, lifts the pallet to the top and intermittently lowers the pallet as layers are successively stacked thereon. When the loader elevator reaches the bottom, the loaded pallet discharges on the outfeed conveyor. In the embodiment here illustrated, the loading and unloading machines operate essentially independently; therefore, both machines may operate simultaneously or alone.

Accordingly, it is an object of the present invention to provide a combination loader and unloader machine which will automatically transfer pallets from the unloader to the loader according to the demands of the loader and also automatically store any excess pallets discharged from the unloader.

Another object of the present invention is to provide a combination loader and unloader machine which will eleminate the manual handling of pallets discharged from the unloader and employed by the loader.

Another object of the present invention is to provide in a combination loader and unloader a pallet transfer machine which will selectively store and feed to the loader pallets received from the unloader.

Another object of the present invention is to provide a combination loader and unloader machine which is inexpensive to manufacture, durable in structure and efficient in operation.

Another object of the present invention is to provide a combination loader and unloader machine which is well suited to economical mass production and is well suited to operate in plants where dirt and dust may be a factor.

Another object of the present invention is to provide a machine which will reduce to a minimum the manual handling of articles received from and placed on pallets and the manual handling of the pallets themselves.

Other objects, features and advantages of the present invention will become apparent from the following description when taken in conjunction with the accompanying drawings wherein like characters of reference designate corresponding parts and wherein:

FIG. 2 is an enlarged, fragmentary horizontal sectional view taken along line 2—2 in FIG. 1.

FIG. 3 is an enlarged cross sectional view taken along line 3—3 in FIG. 2.

FIG. 4 is a cross sectional view taken along line 4—4 in FIG. 2.

Figure 1:
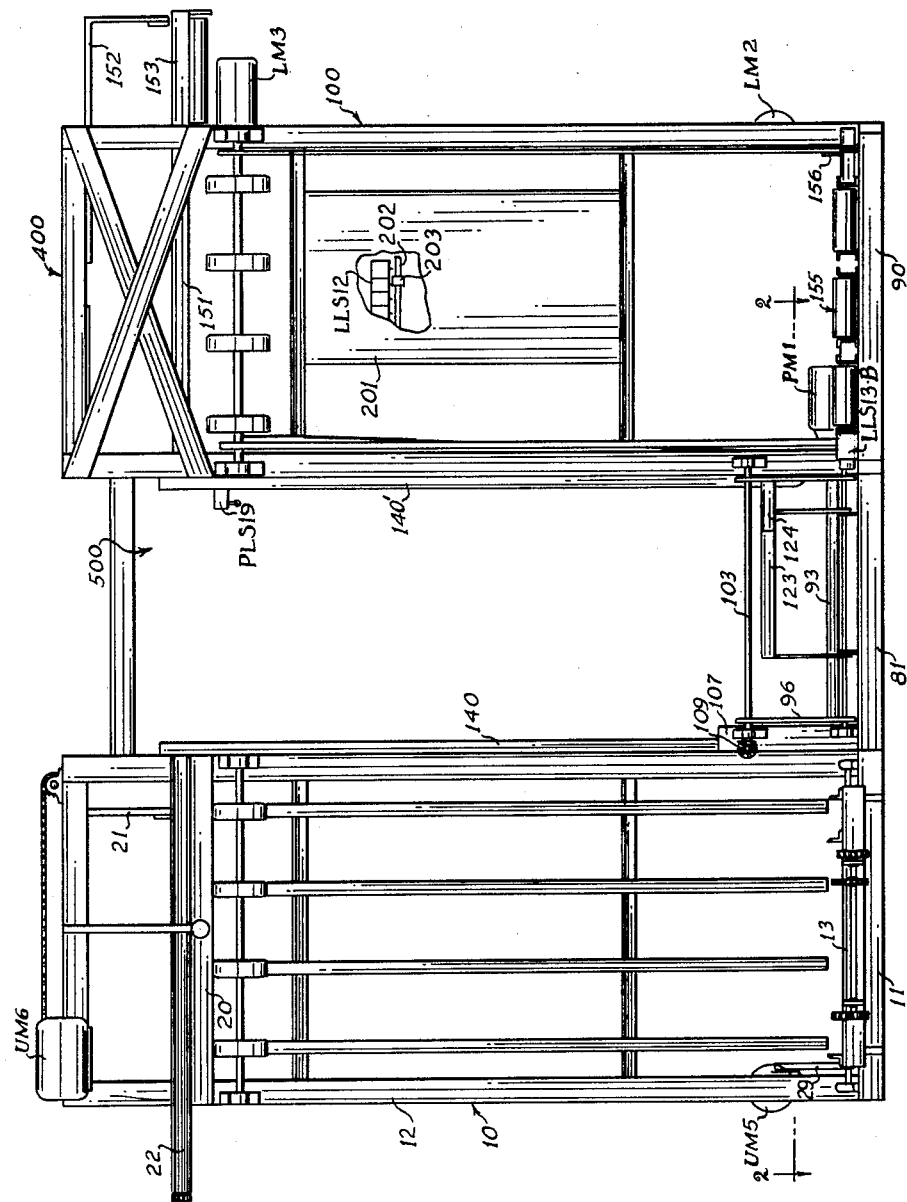
FIG. 1 is a front elevational view of a combination loader and unloader machine constructed in accordance with the present invention.

Referring now in detail to the embodiment chosen for the purpose of illustrating one form of the inventive concept, it being understood that in its broader aspects the present invention is not limited to the exact details depicted in the drawings, the combination loader and unloader machine includes an unloader denoted generally by numeral 10, a loader denoted generally by numeral 400 and a pallet magazine section denoted generally by numeral 500, all arranged on a common frame base in side-by-side relationship with the magazine section 500 between the loader 400 and the unloader 10. Unloader 10 has essentially the same mechanical parts as my "Unloader" disclosed in my copending application Serial No. 805,412 filed April 10, 1957, and operates in substantially the same manner. Likewise, the loader 400 has essentially the same mechanical parts as my "Stacking Machine" disclosed in my copending application Serial No. 665,334 filed June 12, 1957 and operates in substantially the same manner. It will be understood, however, that any type of loader or unloader may be employed in place of the loader 400 and unloader 10, provided that such machines have the essential elements which coact with the cross feed arrangement to be described hereinafter.

The purpose of the unloader 10 is to receive successive stacks of articles, for example soft drink crates which are stacked in layers of six crates per layer on a pallet, and to remove these crates from the pallet so as to feed the crates in single file fashion to the automatic machinery which washes the bottles, cleans the crates, refills the bottles, and returns the bottles to the crates. Thereafter the filled crates are fed to the loader 400, stacked on a pallet and discharged.

UNLOADER SECTION

As best seen in FIG. 1, the unloader 10 includes a base frame 11 and an upright frame 12 mounted on base 11. The frame 12 has an open front through which the stacked crates may travel, the crates being mounted on a pallet which is moved inwardly by an infeed conveyor on base portion 11. The infeed conveyor includes an outer infeed conveyor portion 13 and an inner infeed conveyor portion 14 aligned with each other with the discharge end of portion 13 spaced slightly from the infeed end of portion 14. The inner infeed conveyor portion 14 is within the confines of frame 12 and is spaced sufficiently from the end of the outer portion 13 so that the elevator 15, when in its lowermost position, encompasses the inner conveyor portion 14 with the pallet receiving surface of the elevator below the conveying surface of the conveyor. For this purpose the elevator 15 is preferably a rectangular frame formed of L beams including side bars 16, 16', front beam 17 and rear beam 17' joined at their ends, the opposed side bars 16, 16' thereof having upstanding guides or flanges 18, 18' parallel to and on opposite sides of the infeed conveyor for guiding the pallet thereon. Adjacent the rear beam 17' on frame 12 is a hinged stop 19 which limits the inward travel of the pallet and actuates switch ULS9.

The elevator 15 is appropriately carried by chains (not shown) driven by a motor (not shown) having starting coil UM3U for operating the motor to move elevator 15 up and coil UM3D for operating the motor to move the elevator 15 down. The elevator 15 thus may be moved vertically within the frame 12 so as to raise progressively the pallet and its crates as each layer of crates is removed from the stack by the slide plates 20 located in the upper portion of the frame 12. Cooperating with the slide plates 20 is a rake 21 which feeds each layer of crates to the article discharge conveyor 22 driven by motor UM6. After all crates are removed from the pallet, the elevator 15 automatically lowers to its bottommost position carrying with it the empty pallet which is deposited on portion 14 of the infeed conveyor.

Figure 5:
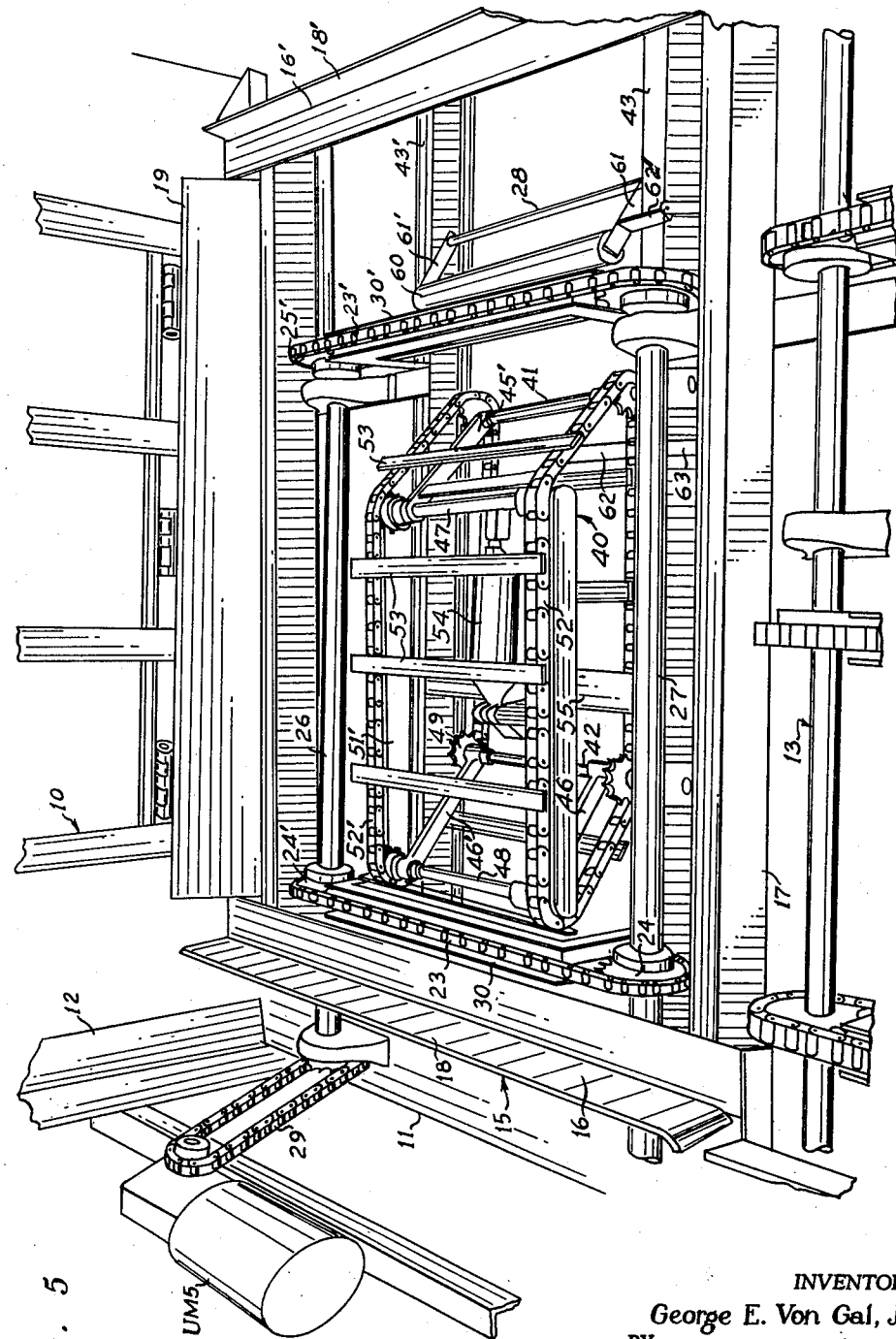
FIG. 5 is an enlarged, fragmentary perspective view of the pallet discharge member in the unloader shown in FIG. 1.

It will be observed in FIG. 5 that the inner conveyor portion 14 includes a pair of spaced, horizontally disposed continuous chains 23, 23' carried on sprockets 24, 24', 25, 25'. Chains 23, 23' are parallel to and inwardly of the side flanges 18, 18' and the upper flight of the chains 22, 22' are above the plane of the elevator 15, when the elevator 15 is in is lowermost position. This is so that the infeed conveyor may move the loaded pallet to a position over the elevator 15 until the loaded pallet strikes stop 19. The sprockets 24' and 25' are carried by a common drive shaft 26 while the sprockets 24 and 25 are carried by a shaft 27, the shafts 26 and 27 being journaled appropriately on base 11. Shaft 26 is driven by a motor UM5 via chain 29. The shaft 27 is linked to the outer conveyor portion 13 so that both portions 13 and 14 may be actuated simultaneously upon energization of motor UM5.

The upper flight of chains 23, 23' are slidably carried by channel members 30, 30' appropriately supported by base 11. The structure thus far described is disclosed in greater detail in my copending application Serial No. 805,412, which is made a part hereof by reference thereto.

According to the present invention, a pallet cross feed discharge member denoted generally by numeral 40 is provided within the space defined by chains 23, 23' and shafts 26 and 27. This discharge member 40 has two functions; namely, it lifts the pallet above the elevator 15 and from chains 23, 23', and then discharges the pallet to the remaining portion of the cross feed conveyor through one side of frame 12. To accomplish this, the discharge member 40 includes, as seen in FIG. 5, a pair of spaced shafts 41 and 42 arranged slightly below and normal to the shafts 26 and 27 so as to be parallel to and between the chains 23, 23'. The shafts 41, 42 are journalled by ribs 43, 43' within base 11, the shaft 41 protruding behind the frame 11 and being provided with a drive sprocket 44, seen in FIG. 2.

Spaced complementary levers 45, 45' are each journalled by one end on shaft 41. Similarly, spaced complementary levers 46, 46' are journalled by their ends on shaft 42. The other ends of levers 45, 45' journal a shaft 47 and the other ends of levers 46, 46' journal a shaft 48. Outwardly of the levers 45, 45', 46, 46', the shafts 41, 42, 47 and 48 carry relatively small sprockets such as sprocket 49, and outwardly of these sprockets the ends of shafts 47 and 48 are connected together by cross bars 51, 51', the cross bars 51, 51' being of a length substantially equal to the distance between shafts 41 and 42 so that a parallelogram arrangement is provided with the shafts 41, 42, 47 and 48 forming the corners thereof.

Spaced parallel continuous chains 52, 52' are received on the sprockets, such as sprocket 49, and spaced parallel conveyors bars 53 extend between and are carried by chains 52, 52'. Thus, a continuous conveyor is provided around the outside of the parallelogram arrangement, the upper flight of which may be raised or lowered while remaining relatively horizontal, depending upon the positions of the levers 41, 42, 47 and 48.

For automatically raising and lowering the upper flight of chains 52, 52', a double acting hydraulic cylinder 54 is pivotally mounted by one end to a center bar 55 extending between ribs 43, 43', the cylinder 54 having a piston (not shown) connected to a piston rod 56. The end of piston rod 56 is pivotally connected to a cross bar 57 secured between levers 45, 45' adjacent shaft 47. When shaft 41 is rotated, the chains 52, 52' are driven around the parallelogram arrangement and where piston rod 56 is extended, the levers 45, 45', 46, 46' are pivoted about shafts 41 and 42 from the reclined position or lowered position shown in FIG. 5 to a substantially upright position, thereby lifting shafts 47 and 48 and hence lifting the upper flight of chains 52, 52' above the level of chains 23, 23'. When piston rod 56 is retracted the upper flight of chains 52, 52' is lowered below upper flight of chains 23, 23'.

It is therefore seen that when the piston rod 56 is extended and when the shaft 41 is rotated, the empty pallet which is returned by the elevator 15 to the chains 23, 23' will be lifted above the chains 23, 23' and urged to the right in FIG. 5 toward the magazine section 500.

It may be found desirable to provide a guide roller assembly operating in conjunction with discharge member 40 for aiding the pallet to clear the chain 23' and flange 18'. To this end I have provided in idler roller arranged parallel to and adjacent the chain 23'. In this arrangement the idler roller 60 is supported for rotation between the ends of a pair of levers 61, 61', the other ends of which are pivotally carried on a shaft 28 journalled by the ribs 43, 43' so that the roller 60 is interposed in the space between side bar 16' and chain 23'. Braces 62, 62' extend respectively from lever 45 and lever 61 and are linked together by a U-shaped link 63. Levers 61, 61' extend essentially parallel to the levers 45, 45', 46, 46' and hence when piston rod 56 raises these levers 45, 45', 46, 46', the levers 61, 61' are simultaneously raised. When levers 61, 61' are raised, the roller 60 is lifted from below the plane of chains 23, 23' to above that plane and above the guide or flange 18'. Therefore, the empty pallet, propelled by the parallelogram conveyor, i.e. chains 52, 52' and conveyor bars 53, will be discharged from the unloader 10 across roller 60 in a path normal to the infeed conveyor into the magazine section 500.

MAGAZINE SECTION

In the magazine section, the empty pallet is received on a cross feed conveyor portion which, as seen in FIG. 2, includes a receiving roller 70 outwardly adjacent and parallel to flange 18' when the elevator is in its lowermost position. The periphery of roller 70 is preferably rubberized so as to impart sufficient frictional force to the empty pallet to urge the same onto the opposed spaced parallel cross feed chains 71, 71' which, in turn, feed the pallet onto the cross feed chains 86, 86' aligned respectively with chains 71, 71'.

In more detail, the roller 70 is carried for rotation by a shaft 73 journalled by bearings 74 on the inner edge of base 11. Outwardly of bearings 74, the shaft 73 is provided with sprockets 75, 75' around which are trained the chains 71, 71'. Outwardly of sprocket 75', the shaft 73 has a sprocket 76 which receives a continuous chain 77 which engages sprocket 44. Thus, shaft 41 and shaft 73 are linked together for simultaneous rotation.

The diameter of roller 70 is greater than the diameter of sprockets 75, 75' and the linear speed of the upper flight of chains 71, 71' is about the same as the linear speed of the chains 52, 52'. Further, the upper flight of chains 52, 52' in its raised position is in about the same plane with the upper periphery of roller 60 in its raised position and the upper flight of chains 71, 71', this plane being above the flange 18' when the elevator 15 is in its lowermost position.

Aligned with sprockets 75, 75' and carried on shaft 78 are sprockets 79, 79' around which chains 71, 71' pass. The shaft 78 is carried by bearings 80, 80' on the cross frame base portion 81. Spaced from and parallel to shaft 78 is a second shaft 82 having sprockets 83, 83' aligned with sprockets 79, 79'. Shaft 82 is supported for rotation by bearings 84, 84' on base 81 and is linked to shaft 78 by a sprocket and chain arrangement 85. A second pair of spaced parallel continuous chains 86, 86' passes around sprockets 87, 87' on shaft 88, the shaft 88 being carried by bearings 89, 89' on the inner edge of the loader base portion 90. Shaft 88 is driven by a cross feed motor PM1 mounted on base 90 and is provided with a central discharge roller 92 similar to roller 70 on shaft 73.

It is now seen that, upon energization of motor PM1, the shafts 88, 82, 78, 73 and 41 are rotated simultaneously in the same direction by the linkages heretofore described. Hence, chains 52, 52', 71, 71', 86, 86' which are in alignment transversely of the machine are all simultaneously driven in the same direction. Thus, when an empty pallet is discharged from chains 52, 52' it will be carried by the upper flight of chains 71, 71' and then chains 86, 86' through the magazine section and discharged into the bottom position of the loader frame 90, unless, of course, the motor PM1 is stopped during such travel or the pallet is otherwise arrested. A treadle PLS10 is positioned in the path of the pallet, the treadle PLS10 being adjacent roller 92.

Under suitable conditions, as will be described hereinafter, the motor PM1 will be stopped so that the empty pallet remains in the magazine section, the empty pallet resting about midway of the chains 71, 71', 86, 86' of the cross feed conveyor. In such a condition, the empty pallet is adapted to be stored in the magazine by an elevator denoted generally by numeral 93. The elevator 93 is in the form of an H, having outer parallel L beams which form the saddle bars 94, 94' for engaging and lifting the empty pallet by its edges. A truss 95 is connected by its ends to the central portions of bars 94, 94' to complete elevator 93.

As viewed in FIG. 2, the truss 95 is between shafts 78 and 82 and the saddle bars 94, 94' are outwardly adjacent the chains 71, 86 and 71', 86' respectively. In its lowermost position, the surface of elevator 93 as viewed in FIG. 7 is below the plane of the upper flight of chains 71, 71', 86, 86' and hence does not interfere with the travel of the pallet on the crossfeed conveyor.

Figure 7:
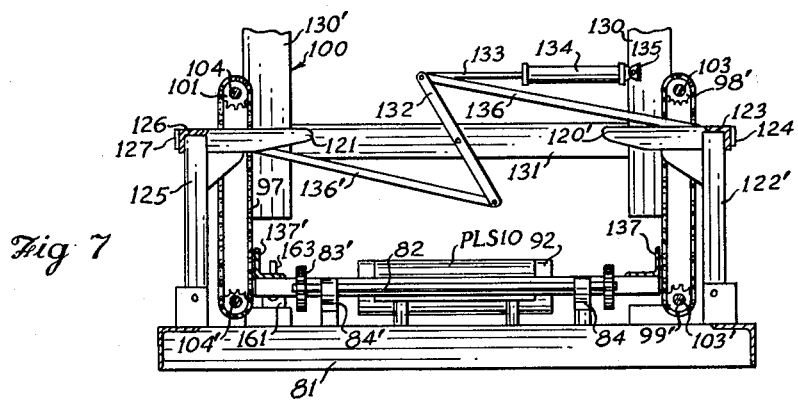
FIG. 7 is a cross sectional view taken along line 7—7 in FIG. 6.

For raising and lowering the elevator 93, the end portions of the saddle bar 94 are connected to vertically disposed continuous chains 96, 96' and the end portions of bar 94' are connected to complementary continuous chains such as chain 97 in FIG. 7. The chains 96, 96' pass around sprockets 98, 98', 99, 99' while the chains, such as chain 97, pass around sprockets such as sprockets 101, 102, horizontal upper shafts 103, 103' support sprockets 98, 98' and 101 respectively while horizontal lower shafts 104, 104' support the sprockets 99, 99' and 102.

Figure 6:
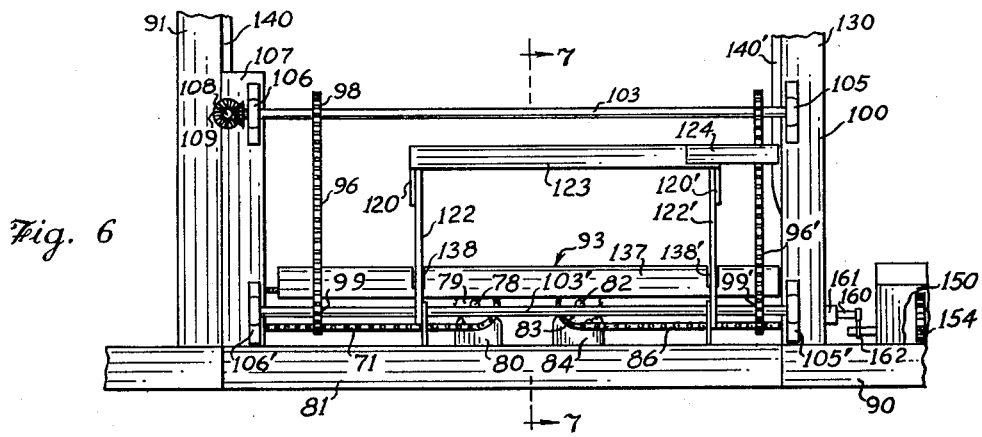
FIG. 6 is an enlarged fragmentary front elevational view of the magazine section of the machine shown in FIG. 1.

Inner vertical standards 130, 130' of the loader frame 100 support the bearings, such as bearings 105, 105' for one end of shafts 103, 103', 104, 104'. The other end portions of shafts 103, 103', 104, 104' are supported by bearings, such as bearings 106, 106' on upstanding struts 107, 107', the struts 107, 107' being secured to the inner vertical standards 91, 91' of the unloader frame 12, as shown in FIG. 6.

Equal and opposite rotation of shafts 103 and 104 is produced by a drive shaft 108 extending between the ends of shafts 103 and 104 and supported by struts 107, 107' the drive shaft 108 having appropriate bevel gears, such as gear 109, meshing with bevel gears, such as gear 110 on shafts 103 and 104. The shaft 108 is rotated in either direction by a motor PM2 seen in FIG. 2 which drives a chain 112 passing around a sprocket (not shown) on shaft 108. Thus, upon rotation of motor PM2 in one direction via coil PM2U, the elevator 93 is raised and upon rotation of motor PM2 in the other direction via coil PM2D, the elevator 93 is lowered.

For cooperating with the elevator 93 so as to receive and hold the empty pallet in the pallet magazine zone when the same is lifted by elevator 93 and for releasing such pallet to the elevator 93 when there is a demand for a pallet, I have provided a pallet engaging and releasing member which includes opposed pallet carrying fingers 120, 120', 121, 121' which move into and out of engagement with opposite edges of the pallet. The fingers 120, 120' are spaced parallel members which are carried at the upper ends of a pair of spaced upstanding rockers 122, 122', the outer ends of the fingers 120, 120' being joined by a strap 123 from which protrudes an actuator arm 124. The rockers 122, 122' are pivotally mounted by the lower ends to base 81 outwardly adjacent shaft 103'.

In complementary fashion, the fingers 121, 121' are carried by rockers, such as rocker 125, which are pivoted to base 81 outwardly adjacent shaft 104', the outer ends of fingers 121, 121' being joined by strap 126 and having an actuator arm 127.

As viewed in FIG. 7, the loader frame 100 includes a pair of upstanding inner L-shaped standards 130, 130', the lower opposed portions of which are cut away to provide for the passage of a pallet therebetween. A pivot lever supporting brace 131 extends horizontally between standards 130, 130' at about the level of fingers 120, 120', 121, 121' and is provided in its central portion with a lever 132 pivotally mounted thereon. Lever 132 is adapted to be rocked by the piston rod 133 of a horizontally disposed double acting air cylinder 134 pivotally supported at numeral 135 by standard 130. The opposed lever arms of lever 132 are provided with rigid links 136, 136' which connect to actuator arms 124 and 127, respectively. With piston rod 133 extended, as shown in FIG. 7, the fingers 120, 120', 121, 121' are in a pallet engaging position or normal position; however, when the piston rod 133 is contracted, the fingers 120, 120', 121, 121' are moved outwardly to pallet releasing position. In the normal position, the distance between fingers 120, 120' and 121, 121' is less than the width of a pallet and less than the distance between saddle bars 94, 94'. In the pallet releasing position, the distance between fingers 120, 120' and 121, 121' is greater than the distance from the upstanding flanges 137, 137' of saddle bars 94, 94'. Further, the upstanding flanges 137, 137' are provided with upwardly opening slots, such as slots 138, 138' through which the fingers 120, 120', 121, 121' are movable.

As best seen in FIG. 1, the corners of the pallet magazine or magazine section are defined by guide bars, such as bars 140, 140', which form a vertical chute for receiving pallets stacked one upon the other. When a pallet is on the crossfeed conveyor and is to be stacked, the elevator 93 is actuated to lift this pallet to the plane of fingers 120, 120', 121, 121' with the fingers being moved outwardly before the pallet is lifted to the uppermost position of the elevator 93. Thereafter the fingers 120, 120', 121, 121' are moved inwardly so as to protrude between the upper and lower surfaces of the pallet and thereby hold the same. The elevator 93 is then lowered to its lowermost position and is adapted for receiving and lifting other pallets in like manner, the latest pallet received being inserted beneath all other pallets in the magazine.

Conversely, when a pallet is needed, the elevator is raised to its uppermost position so as to form a support for the lowermost pallet in the chute, the fingers 120, 120', 121, 121' are moved outwardly, thereby disengaging from the lowermost pallet and then moved inwardly after the stack of pallets is lowered sufficiently for the fingers to be engaged with the pallet next above the lowermost pallet.

LOADER SECTION

As stated above, the loader section is substantially identical to the apparatus shown in my copending application Serial No. 665,334, the loader including a base 90, and a frame 100 which contains a flat metal loader elevator 150 which may be moved in a vertical path within the frame 100. The upper porton of the frame 100 contains drop gates 151, a rake 152 and a crate feed conveyor 153 operated by motor LM3. In operation, the elevator 150 is raised by motor LM2 to its uppermost position and then lowered progressively as each layer of crates which have been formed by the rake 152 on the drop gates 151 is stacked onto the pallet carried by the elevator 150. As the elevator approaches its bottommost position, a pair of chains, such as chains 154 within base 90, protrude through openings in the elevator 150 so that further downward movement of elevator 150 deposits the loaded pallet on these pairs of opposed parallel continuous chains 154, which in turn feed the loaded pallet over elevator 150 onto the outfeed conveyor rollers 155.

When operating according to the present invention, the elevator 150, after a loaded pallet has been discharged, "jogs" upwardly slightly so that the plane of elevator 150 is above the outfeed conveyor chains 154. In such a position, the elevator 150 is adapted to receive a new pallet from the cross feed conveyor.

In will be observed in FIG. 6 that the upper flight of the outfeed conveyor chains, such as chain 154, is below the upper flight of the cross feed conveyor. The jog position of the elevator 150 is such that the pallet receiving surface of the elevator 150 is above the plane of the upper flight of the chains, such as chain 154, but parallel to or slightly below the plane of the cross feed conveyor. This is so that the pallet discharged from the cross feed conveyor will slide onto the elevator 150 without damaging or contacting chains, such as chain 154.

Figure 8:
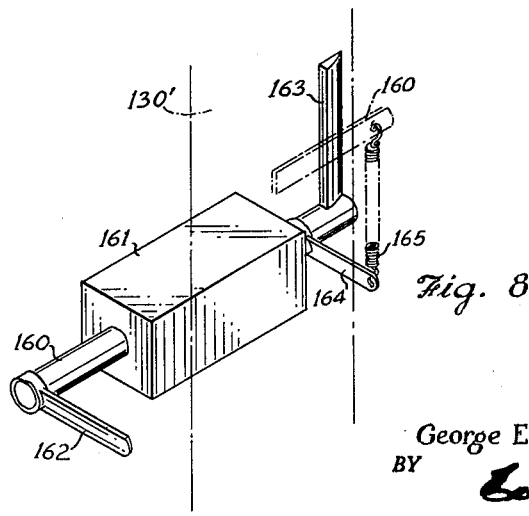
FIG. 8 is an enlarged perspective view of a detail showing the magazine arresting interlock between the magazine section and the loader section of the machine shown in FIG. 1.

To arrest the empty pallet when received on the elevator 150, the outer side of elevator 150 is provided with an upstanding stop flange 156, seen in FIG. 1. To prevent the pallet from being fed by the cross feed conveyor into the loader frame 100 at all times, except when the elevator 150 is down sufficiently to receive a pallet, there is provided an interlock mechanism which, as seen in FIG. 8, includes a pivotal shaft 160 rotatably carried by a journal 161 mounted on standard 130', as seen in FIG. 7. The shaft 160 protrudes into the magazine section and into the loader section in a plane slightly below the plane of the upper flight of the crossfeed conveyor.

As seen in FIG. 8, the shaft 160 at the loader end thereof is provided with a lever 162 extending radially therefrom. At the other end of shaft 160 is a stop 163, which is also radially extending, but normal to the lever 162. Adjacent stop 163 a lever 164 projects in a path parallel to lever 162 from shaft 160. A spring 165, connected by one end to an overhanging arm 166 on standard 130', is connected by its other end to lever 164 and urges a key (not shown) in a counterclockwise direction in FIG. 8.

The stop 163 extends upwardly when the shaft 160 is in its arrested position while the lever 162 extends in a horizontal direction such that it may be struck and rotated by an arm 167 on the bottom of elevator 150 when the elevator approaches its bottommost position or is in its "jog" position. Thus, the stop 163 is rotated clockwise in FIG. 8 so that it no longer blocks the travel of the pallets from the crossfeed conveyor.

ELECTRICAL CIRCUITRY

The functions of the various switches are summarized in the following Table I wherein the term "LLS" means loader limit switch, the term "PLS" means pallet magazine limit switch, the term "PR" means pallet magazine relay, and the term "ULS" means unloader limit switch:

*Table I*

LOADER

LLS1
   (1) Operates drop gate open air cylinder solenoid valve.
   (2) Stops rake from operating after a full layer of cases is formed.

LLS2
   In conjunction with LRL1U stops drop gate from opening if no pallet is in the elevator.

LLS3
   (1) Start elevator down when drop gates are open.
   (2) Stop rake from operating when drop gates are open.

LLS12
   Cam limit switches. Control stack height and elevator up and down limits.

*Table I—Continued*
LOADER—Continued

LLS13
  (A) Insure that the full pallet is clear of the elevator before allowing elevator to go up.
  (B) Starts pallet cross feed when full pallet clears elevator.

PALLET MAGAZINE

PLS10
  Energizes PR1 and PR2 Coils:
PR1N
  (1) Starts pallet magazine elevator up to stack pallet when unloader has another ready to discharge.
  (2) Starts pallet magazine elevator up to get a pallet when loader calls for one.
  (3) In conjunction with
  (4) Start loader elevator up to jog position when a pallet magazine has a pallet ready to feed.
PR2W
  (1) In conjunction with PLS15 operate swing arm air cylinder to unstack a pallet when loader calls for one.
PR2W
  (2) In conjunction with PLS15 operate swing arm air cylinder to stack a pallet when unloader is ready to discharge one.
PR1W
  (3) Starts unloader pallet infeed—insures pallet on unloader elevator is completely clear before feeding in a full pallet zone.
PLS11
  Pallet magazine elevator up limit.
PLS15
  In conjunction with PR2W(2), PR1W(3), and the pallet magazine elevator reversing motor starter PMLU and PL2D, control the swing arm air cylinder to either stack or unstack pallet at the proper time.
PLS19
  Stops unloader from discharging pallet when pallet magazine is full. Stops pallet pick up air cylinder from operating.
PLS22
  Pallet elevator down limit.

UNLOADER

ULS1
  Unloader elevator overload.
ULS5
  (A) Stops elevator up circuit until rake is returned.
  (B) Stops rake return.
ULS6
  Feeds pallet forward to be in position to enter machine when required.
ULS7
  (A) Elevator up limit.
  (B) Closes parts of elevator down circuit.
ULS8
  (1A) Elevator down limit.
  (1B) Starts infeed.
    Energizes UR2 relay.
    UR2
      (1) Energizes pallet pick up air cylinder.
      (2) Starts pallet cross feed motor.
  (2A) Elevator down limit on elevator down jog circuit.
  (2B) Energizes UTR1 coil.
    UTR1
      Starts pallet infeed if no pallet engages.
      PLS10 in 15 seconds (used only on the first operation of the day when no pallet is on the elevator).
ULS9
  (A) Stops infeed.
  (B) Starts elevator up.
ULS13
  (1) Stops elevator from coming up until plates are fully returned.
  (2) Breaks hold in contact on UR5.

*Table I—Continued*
UNLOADER—Continued

ULS14
  In series with ULS13 performing the same function.
ULS21
  Elevator emergency up stop.

In Table II, the explanation of the symbols or notations in the wiring diagram is found:

*Table II*

Figure 9:
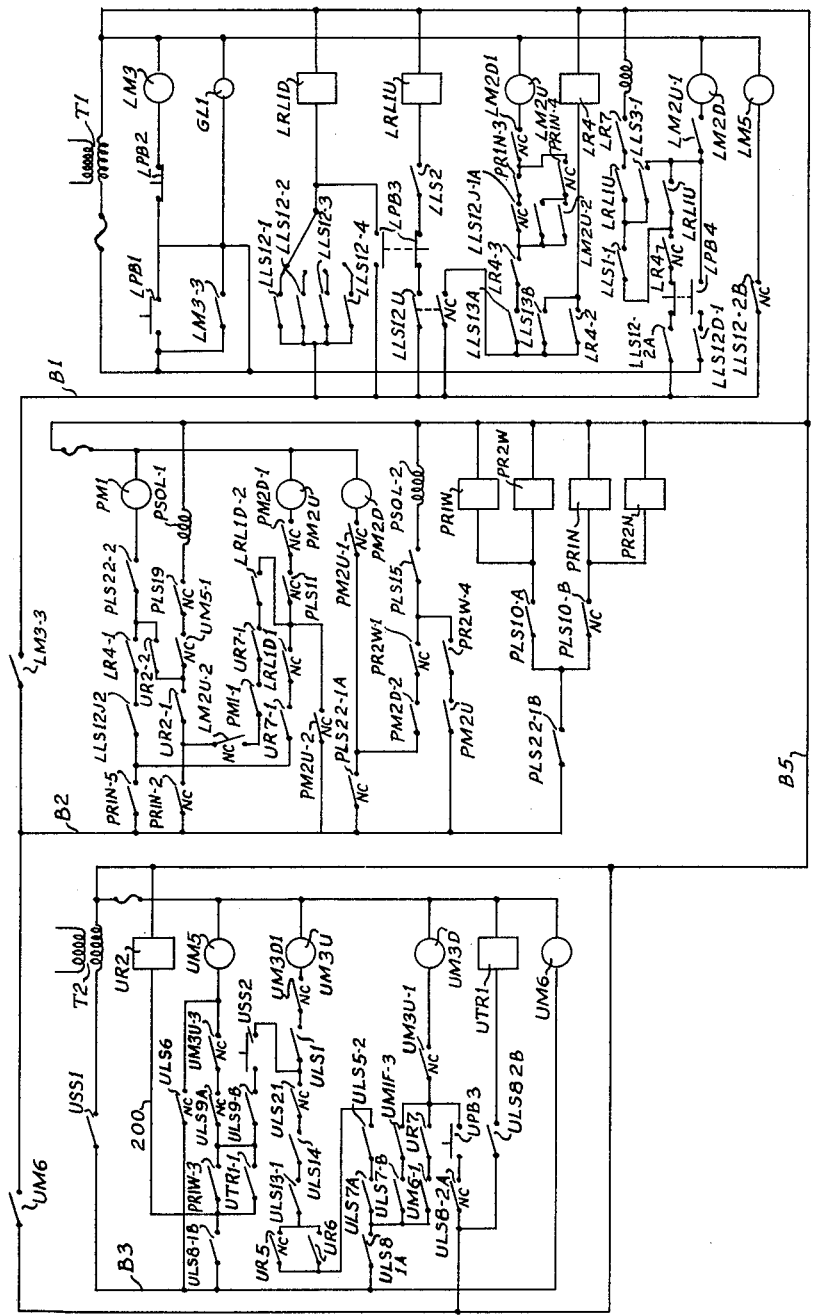
FIG. 9 is a wiring diagram of a portion of the circuitry employed by the machine of FIG. 1.

U—Unloader
L—Loader
P—Pallet magazine
M—Motor starter coil
R—Relay coil
Sol—Air cylinder solenoid
LS—Limit switch
O.L.—Overload switches
G.L.—Indicating lights
P.B.—Push button
S.S.—Selector switch In the diagram of FIG. 9, clarity dictated that the relay switches be dissociated from their relays or coils. Therefore, throughout, where the same symbol is employed, it means that the coil of that symbol operates the switch. For example, UR2–1 means that switch UR2–1 is controlled by relay or coil UR2 of the unloader. Further, while the circuitry for components of both the loader and unloader is included in FIG. 9, only that portion necessary to a proper understanding of the handling of the pallet will be described in detail since the remaining circuitry is equivalent to the circuitry of the above mentioned copending applications. The operation of the pallet transfer and storage arrangement will now be described in detail with reference to the wiring diagram.

Referring to FIG. 9, it will be seen that current is supplied to the bus B1 from a transformer T1 via start switch LPB1. Also, the closing of switch LPB1 supplies current via switch LPB2 to energize motor LM3 of conveyor 153. The coil of motor LM3 closes switch LM3–3 to supply current to bus B2. The transformer T2 supplies current to bus B3 via switch USS1 which is manually closed to thereby energize motor UM6 of the outfeed conveyor 22. The coil of motor UM6 closes switch UM6–2 whereby current is supplied to bus B4 from transformer T1, thereby placing the transformers in parallel, there being a common return bus B5 for both transformers.

After a pallet has been unloaded by the unloader 10 operating in its customary manner, the elevator 15 descends to its bottommost position where the elevator 15 engages switch ULS8, thereby opening switch ULS8–1A and closing ULS8–1B. The closing of switch ULS8–1A energizes from bus B3 via wire 200 relay UR2 which, in turn, closes switch UR2–1 to thereby energize the solenoid PSOL–1 and admit compressed air to cylinder 54 so that the cross feed discharge member 40 is raised by the extending of piston rod 55, provided the switch PLS19 at the top of the pallet magazine is not engaged by a pallet to indicate that the magazine is full of pallets and can receive no more. Simultaneously, relay UR2 closes switch UR2–2 which, provided switch PLS22–2 is closed, energizes cross feed motor PM1 to operate the cross feed conveyor. The pallet limit switch PLS22 is located in the lower portion of the pallet magazine in a position to be engaged and closed by elevator 93 when it is in its lowermost position. Thus, the pallet from the unloader is fed by the cross feed conveyor until the pallet engages and depresses a hinged treadle PLS10 on base 81 adjacent and in front of the roller 92. The treadle PLS10 controls switches PLS10A and B, and when depressed, it closes switch PLS10A to supply current to coils PR1W and PR2W of latch relays PR1 and PR2 while, at the same time, interrupting current to coils PR1N and PR2N. This current via switches PLS10A and PLS10B is supplied only when the pallet elevator 93 is down sufficiently that finger 250 is not contacting switch PLS22 so that switch PLS22–1B is closed.

It is now seen that the pallet, fed on the cross feed conveyor, continues its travel until it strikes treadle PLS10, at which time the energizing of coil PR1N opens switch PR1N2 which opens the circuit via switch UR2–1 to the solenoid PSOL–1. The interrupting of current to solenoid PSOL–1 causes the introduction of air into the air cylinder 54 to retract the piston rod 56 and lower the cross feed discharge member 40. Thereby placing the unloader in condition to receive another loaded pallet to be unloaded, the switch PR1W3 permits the actuation of motor UM5 to feed the pallet to be unloaded to the unloader.

Returning again to the empty pallet, it may either be fed across to the loader elevator 150 or stored. If the elevator 150 has moved downwardly with a loaded pallet, it has closed switch PLS22–2. When the loaded pallet has been discharged, switch LR4–1 will be closed, the relay LR4 having been energized because the discharging loaded pallet closes switch LLS13–B sufficiently for the relay LR4 to be held closed by its hold down switch LR4–2.

It should be noted that switch LLS12, which includes switches, such as LLS12J–1A, etc., is located in the control panel 201 of the loader 400 and includes a worm gear 202 synchronized with the travel of the elevator 150 and a traveller 203 contacting the various switches of switch LLS12 at appropriate times, as explained in more detail in my copending applications.

With switch LLS13 returned to its original position after the loaded pallet has passed, the switch LLS13–A is closed, switch LR4–3 is closed because coil LR4 is energized and current is supplied via switch LLS12–J–1A through switch PR1N3 to energize the coil LM2U of motor LM2 to start elevator 150 up. The elevator 150 thus moves up only a short distance when switch LLS12J–1A is opened and switch LLS12J–1B and switch LLS12J–2 are closed. The closing of switch LLS12J–2 completes the circuit to motor PM1 so that the cross feed conveyor continues to move the empty pallet, thereby depositing the pallet on the loader elevator 150.

On the other hand, if the elevator 150 is not in position to receive the pallet, the pallet remains on the cross feed conveyor and is stacked when the unloader elevator starts down. This is accomplished when switch UR7–1 is closed upon the energizing of relay UR7 by the closing of switch UM302 upon the energizing of coil UM30 of the unloader elevator UM3. It will be remembered that as the pallet strikes treadle PLS10, it closes switch PLS10–A to supply current to coils PR1W and PR2W. This, in turn, closes switch PR1N5 which supplies current via switches UR7–1, LR1D1, PLS11 and PM2D–1 to the up coil PM2U of motor PM2. In this circuit, switch PM2D–1 is opened only when the down coils PM2D are energized and therefore would be normally closed unless a pallet were soon needed by elevator 150, in which case the elevator 93 would not lift the pallet. The switch PLS11 is normally closed, and is engaged and opened by plate 251 on elevator 93 as elevator 93 approaches its upper limit of travel and is therefore normally closed. The switch LR1D1 is normally closed, being opened by relay LRL1D only when it is energized by the closing of the selected one of switches LLS12–1, LLS12–2, LLS12–3 or LLS12–4 of switch LLS12 in the control panel as the elevator 150 is moved downwardly. Thus, only switch UR7–1 need be closed to accomplish the stacking operation.

It is therefore seen that the elevator 93 is moved upwardly until it opens switch PLS11 which deenergizes coil PM2U. This permits switch PM2U–1 to close and the elevator moves down until it engages switch PLS22, thereby opening switch PLS22–1A and again closing switch PLS22–1B. This shuts down motor PM2 as the elevator 93 is returned to its original position.

The lifting of the pallet by elevator 93 releases treadle PLS10 and returns the switches PLS10–A and PLS10–B to their original positions. Switch PLS22–1B is open, however, since the elevator is travelling up. No change is effected in the relays PR1 and PR2. The energizing of coil PM2U closes switch PM2U–3 which supplies current via switch PR2W4 to activate switch PLS15. As the elevator 93 approaches its topmost position it engages switch PLS15 which energizes switch PSOL–2 and supplies air to cylinder 134 to retract piston rod 133 and thereby swing the fingers 120, 120′, 121, 121′ outwardly.

As the elevator reaches the top limit of its travel, switch PLS11 is opened, deenergizing coil PM2U and thereby permitting switch PM2U–3 to open and deenergize solenoid PSOL–2. This causes air to be introduced on the other side of cylinder 134 to extend piston rod 133. Thus the fingers 120, 120′, 121, 121′ are moved inwardly and engage the pallet on elevator 93, the elevator and the this pallet having lifted all the other pallets in the pallet magazine. The elevator then descends having stored its pallet.

When the elevator 150 demands a pallet and no pallet is located on the cross feed conveyor, the elevator 93 must go up to the pallet magazine and receive the bottommost pallet which is supported by the fingers 120, 120′, 121, 121′. This is accomplished as follows:

With the treadle PLS10 indicating no pallet on the cross feed, the coils PR1N and PR2N are energized. Thus, switch PR1N2 is closed and current is suppled via switch LM2U–2 (if the elevator 150 is descending rather than ascending) and via switch UR7–1 to activate switch LRL1D–2. As the switch LLS12–1, LLS12–2, LLS12–3 or LLS12–4 is engaged and closed by the follower in the control panel mentioned above, the circuit via switch PS11 is made, energizing coil PM2U and starting the elevator 93 up.

It will be remembered that as the elevator 93 moves up, it releases switch PLS22 to close switch PLS22–1A. Also, since the PR1N and PR2N relay coils were the last energized coils of relays PR1 and PR2, switch PR2W1 is closed to activate switch PLS–15. Therefore, as elevator 93 approaches the fingers 120, 120′, 121, 121′, switch PLS15 is closed, resulting in the energization of solenoid PSOL2. Hence, the piston rod 133 is retracted and the fingers 120, 120′ and 121, 121′ are moved apart to release the stack of pallets onto the elevator 93.

Motor PM2 is then reversed, as described above, as switch PLS11 is opened and the elevator 93 begins its descent. Since switch PR2W1 is closed, switch PR2W4 is open, and switch PM2D–2 is closed, switch PLS15 now determines when the fingers 120, 120′, 121, 121′ are closed. The switch closing member plate 215 on elevator 93 is relatively long and therefore the elevator descends sufficiently for the lowermost pallet to clear fingers 120, 120′, 121, 121′ before switch PLS15 opens. The opening of switch PLS15 returns the fingers 120, 120′, 121, 121′ to their original position, engaging the pallet next above the pallet on elevator 93.

The elevator 93 carrying the empty pallet descends to its bottommost position, thereby depositing the pallet on the cross feed conveyor. This closes switch PLS22–1B and switch PLS10–A, energizing coils PR1W and PR2W. Coil PR1W closes switch PR1N5. Therefore, when switch LLS12J–2 is closed, indicating that the elevator 150 is in proper position, the cross feed deposits the pallet on the elevator.

It will be obvious to those skilled in the art that many variations may be made in the embodiments chosen for the purpose of illustrating the present invention without departing from the scope thereof as defined by the appended claims.

I claim:
1. In a machine of the class described, an unloader, a loader positioned adjacent said unloader, a magazine between said loader and said unloader, and means operatively associated with said unloader, said loader and said magazine for receiving the empty pallets successively from said unloader and for selectively feeding said empty pallets to said magazine and to said loader.

2. In a machine of the class described, an unloader of the type having an infeed conveyor which feeds a loaded pallet to an unloader elevator for unloading articles from said pallet, the unloader elevator incidentally moving within said unloader during the unloading operation, a loader position adjacent said unloader, said loader being of the type having a loader elevator which receives a pallet on which layers of articles are to be loaded, said elevator incidentally moving within said loader during the loading operation, a magazine between said loader and said unloader, and means operatively associated with said unloader, said loader and said magazine for receiving the empty pallets successively from said unloader and for selectively feeding said empty pallets to said magazine and to said elevator of said loader.

3. In a machine of the class described, an unloader of the type having an infeed conveyor which feeds a loaded pallet to an unloader elevator for unloading articles from said pallet, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, a magazine between said loader and said unloader, control means for indicating when said loader requires a pallet, and means operatively associated with said unloader, said loader and said magazine for receiving the empty pallets successively from said unloader and controlled by said control means for selectively feeding said empty pallets to said magazine and to said elevator of said loader.

4. In a machine of the class described, an unloader of the type having an infeed conveyor which feeds a loaded pallet to an unloader elevator for unloading articles from said pallet, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, a magazine between said loader and said unloader, a cross feed conveyor extending from said unloader to said loader via said magazine for removing the empty pallets successively from said said unloader and for selectively feeding said empty pallets to said magazine and past said magazine to said elevator of said loader.

5. In a machine of the class described, an unloader of the type having an infeed conveyor which feeds a loaded pallet to an unloader elevator for unloading articles from said pallet, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, a magazine between said loader and said unloader, means operatively associated with said unloader, said loader and said magazine for receiving the empty pallets successively from said unloader and for selectively feeding said empty pallets to said magazine and to said elevator of said loader, and means for discharging the pallets stored from said magazine to said cross feed conveyor when no pallet is on said cross feed conveyor and a pallet is required by said elevator of said loader.

6. In a machine of the class described, an unloader of the type having an infeed conveyor which feeds successive loaded pallets to an unloader elevator for unloading articles from each of said pallets, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, said loader also having an outfeed conveyor on which the loaded pallet is discharged from the loader, a magazine between said loader and said unloader for holding empty pallets, a cross feed conveyor connecting said unloader and said loader, discharge means in the path of said infeed conveyor and said unloader elevator for transferring a pallet from said unloader elevator when said unloader elevator is in a predetermined position and discharging the same onto said cross feed conveyor, elevator means arranged along said cross feed conveyor for selectively feeding said pallets to said magazine, and control means for actuating said cross feed conveyor when said loader elevator is in predetermined position to discharge said pallet onto said loader elevator after the preceding pallet on said loader elevator has been discharged by said outfeed conveyor, said elevator means including a magazine elevator movable in the path of travel of said pallets along said cross feed conveyor for lifting said pallets vertically from said cross feed conveyor, said magazine being adjacent said magazine elevator, and means for engaging and holding the lifted pallets when said magazine elevator is operating to store said pallets, said means also being adapted to discharge stored pallets to said magazine elevator.

7. In a machine of the class described, an unloader of the type having an infeed conveyor which feeds successive loaded pallets to an unloader elevator for unloading articles from each of said pallets, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, said loader also having an outfeed conveyor on which the loaded pallet is discharged from the loader, a magazine between said loader and said unloader for holding empty pallets, a cross feed conveyor connecting said unloader and said loader, said cross feed conveyor being arranged normal to said infeed conveyor with an infeed end of said cross feed conveyor adjacent the side of said infeed conveyor, discharge means movable vertically in the path of said infeed conveyor and said unloader elevator for lifting a pallet vertically from said infeed conveyor and said unloader elevator when said unloader elevator is in a predetermined position and for discharging the same in a path normal to said infeed conveyor onto the infeed end of said cross feed conveyor, elevator means arranged along said cross feed conveyor for selectively feeding said pallets to said magazine, and control means for actuating said cross feed conveyor when said loader elevator is in a predetermined position to discharge said pallet onto said loader elevator after the preceding pallet on said loader elevator has been discharged by said outfeed conveyor.

8. In a machine of the class described, an unloader of the type having an infeed conveyor which feeds successive loaded pallets to an unloader elevator for unloading articles from each of said pallets, the unloader elevator incidentally moving within said unloader during the unloading operation, a loader positioned adjacent said unloader, said loader being of the type having a loader elevator which receives a pallet on which layers of articles are to be loaded, said elevator incidentally moving within said loader during the loading operation, said loader also having an outfeed conveyor on which the loaded pallet is discharged from the loader, a magazine between said loader and said unloader for holding empty pallets, a cross feed conveyor connecting said unloader and said loader, said cross feed conveyor being arranged normal to said infeed conveyor with an infeed end of said cross feed conveyor adjacent the side of said infeed conveyor, discharge means movable vertically in the path of said infeed conveyor and said unloader elevator for lifting a pallet vertically from said infeed conveyor and said unloader elevator when said unloader elevator is in a predetermined position and for discharging the same in a path normal to said infeed conveyor onto the infeed end of said cross feed conveyor, elevator means arranged along said cross feed conveyor for selectively feeding said pallets to said magazine, and control means for actuating said cross feed conveyor when said loader elevator is in a predetermined position to discharge said pallet onto said loader elevator after the preceding pallet on said loader elevator has been discharged by said outfeed conveyor, said elevator means including a magazine elevator movable in the path of travel of said pallets along said cross feed conveyor for lifting said pallets vertically from said cross feed conveyor, said magazine being adjacent said magazine elevator, finger means between said magazine elevator and said magazine for engaging and holding the lifted pallets when said magazine elevator is operating to store said pallets, said finger means also being adapted to discharge stored pallets to said magazine elevator, and means for selectively actuating said magazine elevator and said finger means in a prescribed sequence for its storing operation and in another prescribed sequence for its discharging operation.

References Cited by the Examiner
UNITED STATES PATENTS

| | | | |
|---|---|---|---|
| 2,681,130 | 6/54 | Atwood | 198—21 |
| 2,774,489 | 12/56 | Guigas. | |
| 2,828,872 | 4/58 | Mangel | 214—16 |
| 2,829,759 | 4/58 | Parker | 198—21 |
| 2,857,058 | 10/58 | Campbell | 214—6 |
| 2,946,465 | 7/60 | Raynor. | |
| 2,987,199 | 6/61 | Zawaski | 214—16 |
| 2,988,195 | 6/61 | McHugh. | |
| 2,993,315 | 7/61 | Verrinder | 214—6 |

HUGO O. SCHULZ, *Primary Examiner.*

GERALD M. FORLENZA, MORRIS TEMIN,
*Examiners.*